(12) United States Patent
Gilg et al.

(10) Patent No.: US 9,753,774 B2
(45) Date of Patent: Sep. 5, 2017

(54) USING FUNCTIONAL RESOURCES OF A COMPUTING DEVICE WITH WEB-BASED PROGRAMMATIC RESOURCES

(71) Applicant: Hewlett-Packard Development Company, L.P., Houston, TX (US)

(72) Inventors: Thomas J Gilg, Corvallis, OR (US); James Allely Rowson, Palo Alto, CA (US); Jon Brewster, Corvallis, OR (US); Joseph Harold Teibel, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/439,062

(22) PCT Filed: Oct. 31, 2012

(86) PCT No.: PCT/US2012/062878
§ 371 (c)(1),
(2) Date: Apr. 28, 2015

(87) PCT Pub. No.: WO2015/084291
PCT Pub. Date: Jun. 11, 2015

(65) Prior Publication Data
US 2015/0355944 A1    Dec. 10, 2015

(51) Int. Cl.
*G06F 9/46* (2006.01)
*G06F 9/50* (2006.01)
*H04L 29/08* (2006.01)
*G06F 21/62* (2013.01)

(52) U.S. Cl.
CPC .......... *G06F 9/5005* (2013.01); *G06F 21/629* (2013.01); *H04L 67/02* (2013.01)

(58) Field of Classification Search
None
See application file for complete search history.

(56) References Cited

U.S. PATENT DOCUMENTS

| 6,928,443 B1 | 8/2005 | Giambalvo |
| 7,496,578 B2 | 2/2009 | O'Brien et al. |

(Continued)

FOREIGN PATENT DOCUMENTS

WO    WO 2012/108547    8/2012

OTHER PUBLICATIONS

Environmental Systems Research Institute, Inc., "The Services Directory and the REST API, " ArcGIS Resource Center, Oct. 21, 2010, <http://web.archive.org/web/20101021134651/http://help.arcgis.com/EN/webapi/javascript/arcgis/help/jshelp/ags_rest.htm#webprint>.

(Continued)

*Primary Examiner* — Gregory A Kessler
(74) *Attorney, Agent, or Firm* — Mahamedi IP Law LLP

(57) ABSTRACT

A request is received from a web-based programmatic resource executing within an application that is installed on the computing device. From the request, one or more functional resources of the computing device are identified. The functional resources are not otherwise accessible to the web-based programmatic resource executing within the installed application on the computing device. A task is performed using the identified one or more functional resources.

15 Claims, 4 Drawing Sheets

(56) References Cited

U.S. PATENT DOCUMENTS

| | | | |
|---|---|---|---|
| 8,024,743 B2 * | 9/2011 | Werner | G06F 9/541 |
| | | | 709/203 |
| 8,171,074 B2 * | 5/2012 | Nakazawa | G06F 9/485 |
| | | | 709/201 |
| 8,176,490 B1 * | 5/2012 | Jackson | G06F 9/468 |
| | | | 718/100 |
| 2002/0143949 A1 | 10/2002 | Rajarajan et al. | |
| 2002/0171678 A1 | 11/2002 | Bandhole et al. | |
| 2007/0078950 A1 | 4/2007 | Hopkins et al. | |
| 2009/0055749 A1 | 2/2009 | Chatterjee et al. | |
| 2009/0240935 A1 | 9/2009 | Shukla | |
| 2011/0055395 A1 | 3/2011 | Wang et al. | |
| 2011/0167403 A1 | 7/2011 | French et al. | |
| 2012/0042078 A1 * | 2/2012 | Kroeger | G06F 17/30017 |
| | | | 709/226 |
| 2012/0050795 A1 | 3/2012 | Nakamura | |
| 2012/0050799 A1 | 3/2012 | Towata | |
| 2015/0319226 A1 * | 11/2015 | Mahmood | H04L 67/42 |
| | | | 709/201 |

OTHER PUBLICATIONS

Steve Francia. "SOAP Vs. REST", Sep. 12, 2012, <http://web.archive.org/web/20120912081140/http://spf13.com/post/soap-vs-rest>.

Kaylor et al., "RestFS: Resources and Services are Filesystems, Too", Mar. 2011, Computer Science: Faculty Publications & Other Works, Paper 15, <http://ecommons.luc.edu/cgi/viewcontent.cgi?article=1012&context=cs_facpubs>.

Anonymous; Representational state transfer; Wikipedia, the free encyclopedia; Oct. 25, 2012; Retrieved from the internet ~ 10 pages.

* cited by examiner

USING FUNCTIONAL RESOURCES OF A COMPUTING DEVICE WITH WEB-BASED PROGRAMMATIC RESOURCES

BACKGROUND

Websites are increasingly providing more functional services and web-based programmatic resources (e.g., web-based applications that run within a web browser). Numerous commercially available browsers exist to enable computing devices of different platforms to access and utilize various programmatic resources and services provided over the Internet. In general, browsers enable end users on different computing platforms to have a uniform experience in accessing websites and their respective services and applications. Despite the many types of computing platforms in use, browsers typically operate using a general protocol, format and rule set. The result is that users have very similar experiences when they access websites, irrespective of the computing device or platform that is in use.

DETAILED DESCRIPTION

Figure 1:
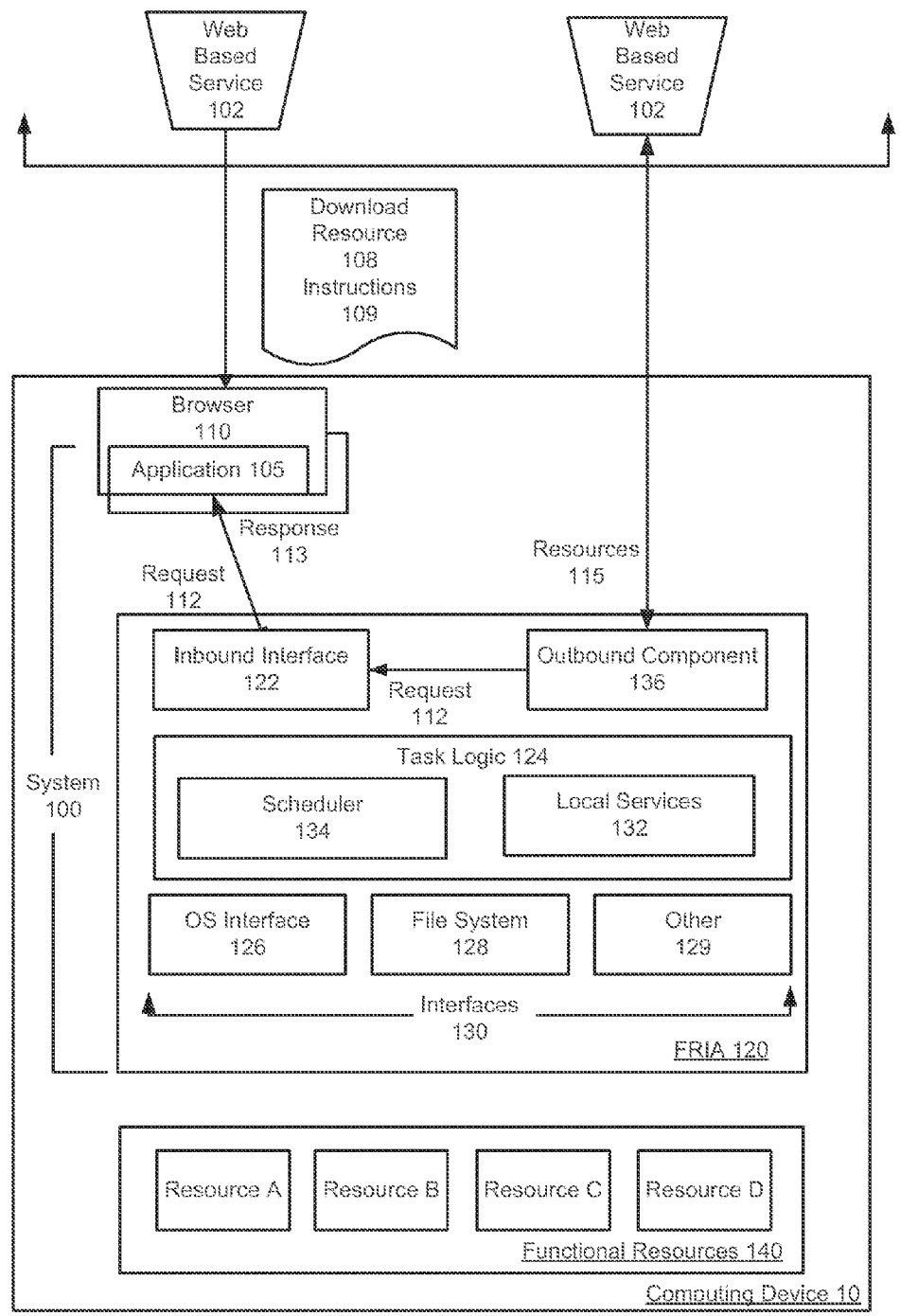
FIG. 1 illustrates an example system for exposing locally available resources of the computing device to web-based programmatic resources.

Embodiments described herein enable functional resources of a computing device to be made available for use with web-based programmatic resources and services. In particular, examples described herein enable applications, such as browsers or other installed programs, to provide environments for the execution of web-based programmatic resources (e.g., web-based applications) that can utilize various functional resources of a computing device, such as local or connected hardware components. Examples of embodiments described herein include an application or data product, computing device, and system for enabling web services and applications to access the functional resources of a computing device.

According to some examples, a request is received from a web-based programmatic resource executing within an application that is installed on the computing device. From the request, one or more functional resources of the computing device are identified, which are not otherwise accessible to the web-based programmatic resource executing within the installed application on the computing device. A task is performed using the identified one or more functional resources.

Still further, a computing device can include a processor to respond to a call, from a web-based programmatic resource that is executed within a browser of the computing device. The call may specify a functional resource of the computing device. The processor utilizes the functional resource in accordance with the call, and provides an output to the web-based programmatic resource.

Still further, in some examples, a set of functional resources are identified on the computing device. A request is received, where the request is generated from a web-based programmatic resource that executes through of a browser of the computing device. A functional resource that is specified in the request is determined. A task is performed in connection with utilizing the functional resource specified in the request.

As used herein, the term "web-based" refers to a designation as being accessed or originated from a website or location on the World Wide Web. Thus, "web-based programmatic resource" and "web-based application" refers to a respective programmatic resource or application that originates from a website or location on the World Wide Web. Another example of a web-based programmatic resource is a native web-oriented application, which can be locally installed to communicate with specific web resources or pages when operated. For example, many computing devices utilize 'apps' that are designed to access and retrieve application content from a specific website. A web-based programmatic resource or web-based application can be executed through an application environment such as provided by a browser or other web-enabled application on a computing device.

In one implementation, request is processed from a web-based application (e.g., browser executing JavaScript application from website) operating on the computing device. In another variation, the request can be triggered by an instruct embedded in a web-based programmatic resource that is provided to a browser from a web service or application. One or more functional resources of the computing device that are specified for use in the request are identified. The one or more functional resources include resources that are not otherwise accessible to web services through the browser. A task may be performed using the identified one or more functional resources.

Still further, an example provides for operating a computing device. The computing device can be operated by instructing a browser that accesses a web-based programmatic resource to signal a call to a second application that is operating on the computing device. The request specifies a functional resource of the computing device. An output from utilizing the specified functional resource can be utilized.

Still further, a first application can be operated on a computing device to identify a set of functional resources. The first application can be operated to respond to a request generated from a web-based programmatic resource. A functional resource specified in the request can be determined. A task can be performed in connection with accessing and utilizing the functional resource specified in the request.

Examples described herein recognize that commercially available browsers typically have limited ability to enable web services to access or utilize the many functional resources of the computing device on which the browser is installed. For example, numerous kinds of web-based computing devices include functional resources that can be accessed and utilized through programming interfaces provided through the operating system of the computing device. Categorical examples of such functional resources include local hardware components that are integrated with the computing device (e.g., sensors), connected devices (e.g., printers and scanners), network connected resources (e.g., home network device) and file system resources.

Commercial browsers have access to the operating system resources of the computing device, but only expose some of those resources to web applications via the browser's own Browser Object Model (BOM). In effect, web applications have very limited access to some computing device resources, unlike the browser and other applications installed natively on the computing device (e.g. Adobe Photoshop). Moreover, different web browsers have different BOMs, limiting the ability of a developer of web-based applications to provide consistent access to the functional resources of the computing device in a manner that maintains a uniform experience for all end users. Furthermore, under conventional approaches, web-based applications operate only to trigger browser-based user interactions, which the web-based application does not control. For example, conventional web-based applications must rely on the browser for printing, and the web-based application cannot control the look and functionality of the browser's printer selection dialog, among other things, nor fully track printing progress thru the browser.

While many shortcomings exist in regard to the ability of a web-based application, for example, to access the functional resources of a computing device, other shortcomings exist with regard to native web-oriented applications which are used with a specific website or resource. Such client applications are typically constrained to specific platforms and devices, and provide limited ability for the end user devices to access web-based application beyond that which the application is designed for. As an example, a native photo management application may be designed to run on WINDOWS (manufactured by the MICROSOFT CORP.), but not on MacOS (manufactured by APPLE INC.).

Among other benefits, examples described herein enable website operators to develop web services and applications which utilize and leverage numerous functional resources of the end user device that are not otherwise available through the browser's BOM. Moreover, while numerous computing device platforms exist, the ability for web services and applications to utilize the functional resources can be made platform agnostic. Thus, developers do not need to generate platform-specific functionality for use with web services and applications that require access of the functional resources of the end user's computing devices.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cellular telephony/messaging devices), and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Overview

FIG. 1 illustrates an example system for exposing locally available resources of the computing device to web-based applications. More specifically, system 100 can be implemented on a computing device 10, and includes application-level programming resources, including one or more browsers 110 and a functional resource interface application ("FRIA") 120. As described in more detail, the system 100 can be implemented to access and use a set of resources 140 that are provided on, or are available to the computing device. The set of resources 140 include hardware resources, which can be accessed and/or controlled through an operating system or other functionality of the computing device 10.

The FRIA 120 can be implemented as an application that operates to provide web-based programmatic resources (e.g., web-based applications that execute through a browser), with access to selected resources in the set of resources 140 of the computing device 10. As described in greater detail, browser 110 provides one example for which web-based applications or other functionality can be executed to generate requests from the FRIA 120 for the functional resources of the computing device 10. In some implementations, the FRIA 120 operates as an independent component on the computing device 10, but can receive and respond to a standard web-based request. As such, the FRIA 120 can be implemented and used in conjunction with any installed application, including any browser operating on the computing device 10.

With reference to the example of FIG. 1, the browser 110 provides an execution environment for a web-based application 105 (as an example of a web-based programmatic resource that is downloaded from a website) to make requests 112 from the FRIA 120. For example, the FRIA 120 can be structured to respond to Hypertext Transfer Protocol (HTTP) calls, such as Representational State Transfer (or 'RESTful') calls made in the execution of web-based application JavaScript through any one of the browsers 110. The FRIA 120 is able to respond to requests and communicate with components that signal such requests (e.g., browser 110). In this way, the web-based applications running through any one of the browsers 110, as well as other applications capable of generating, for example, RESTful calls, are able to receive direct access to operating and other local resources of the computing device 10.

While an example of FIG. 1 specifies use of browser 110, in variations, other web-enabled applications can be utilized to execute web-based programmatic resources that can utilize the FRIA 120. For example, system 100 can be configured to operate with other web-enabled applications that can execute scripts for generating RESTful calls to the FRIA 120.

The computing device 10 can correspond to, for example, a desktop or laptop computer, such as a computer that operates a WINDOWS operating system (manufactured by MICROSOFT CORP.). As an alternative or addition, the computing device 10 can correspond to a mobile computing device, such as a tablet (e.g., iPAD, manufactured by APPLE INC.) or multi-function cellular/telephony device. Still further, in other variations, the computing device 10 can correspond to specialized devices such as a printer, copier, scanner (or combination printer, scanner and/or copier), projector, television or Internet connected appliance.

In operation, one of the browsers 110 residing on the computing device 10 operates to access a web service 102 over the Internet. For example, the browser 110 can be used to execute a web-based application provided from a website. In implementation, the browsers 110 can correspond to commercially available web browsers, such as MICROSOFT EXPLORER (manufactured by the Microsoft Corporation) or FIREFOX (manufactured by the Mozilla Corporation). The web service 102 can correspond to any website that provides a service or application. Specific examples for web service 102 include photo-sharing websites, publishing sites, cloud services (e.g., cloud printing service), coupon sites, etc.

In one implementation, the browser 110 can access a download resource 108, and execute programming logic corresponding to the web-based application 105. According to some examples, the web service 102 embeds instructions 109 in the download resource 108 (e.g., web page). When executed, the application 105 generates a call to the FRIA 120 on the same computing device 10. The instructions 109 can specify a local link or URL that locates the FRIA 120. The instructions 109 can also specify a resource or type of resource (e.g., print job, scan job, OS service, etc.) that is being requested from the FRIA 120. In some implementations, the download resource 108 can include JavaScript that that is executed as the application 105 by the browser 110.

The application 105 can execute through the browser 110 to send a request 112 to the FRIA 120. The request 112 can identify a functional resource (e.g., local resource, connected device, etc.) that is specified in the instructions 109 received from the web service 102. The functional resource can be identified by type or function. The request 112 can also specify a task or operation (or set of operations) that is to be performed by the FRIA 120 in connection with use of the specified functional resource 140. The request 112 to the FRIA 120 can be generated by the application 105 (or other programmatic resource), executing through the browser 110, and can be structured as a standard, web-based call. Any of the browsers 110 that reside on the computing device 10 can be used to access the resource 108, execute the application 105, and signal the request 112 to the FRIA 120.

In one implementation, download resource 108 includes instructions for generating a JavaScript application in the browser 110, from which requests 112 (e.g., RESTful calls) are generated and communicated to the FRIA 120. In response, FRIA 120 can utilize a specified functional resource of the computing device 10 in performing a task (e.g., creating print job, using RIP engine). Optionally, the FRIA 120 can return a response 113 or output to the web-based application executing through the browser 110. As an addition or variation, the download resource 108 can include multiple instructions and logic to enable multiple requests, as well as to process responses from the FRIA 120. For example, the logic provided with the download resource 108 can process an output from the FRIA 120 (e.g., sensor output, confirmation job performed, etc.) and issue another request to the FRIA 120 based on the FRIA output.

The FRIA 120 can be implemented as an application that is active in the background of the computing device 10. In one implementation, when the browser accesses a web site that provides a programmatic resource for utilizing the FRIA 120, resources on the website initiate a check to determine whether the FRIA 120 is installed on the particular machine. If the FRIA 120 is not installed, a download and installation process can be automatically initiated. For example, the user can be prompted (or not) to accept the download of the FRIA 120 application resource. Once downloaded, the FRIA 120 can be made operational on the computing device 10. In one implementation, the FRIA 120 is, by default, operational whenever the computing device 10 is operational. In variations, the FRIA 120 can correspond to an application that is active when any one of the browsers 110 is in use, or alternatively, when the computing device 10 is used for network operations. Still further, the FRIA 120 can be triggered into operation by user settings, user input, and/or other designations.

In an example of FIG. 1, the FRIA 120 includes an inbound interface 122, task logic 124 and a set of local or device interfaces 130 to a set of functional resources 140 of the computing device. The functional resources 140 can include operating system resources, such as integrated hardware components of the computing device (e.g., touchscreen, sensors), connected hardware components (e.g., devices connected through local wireless or wireline ports, such as printer, printer/scanner), locally networked components connected to the computing device (e.g., connected television in home network environment). Still further, in variations, the set of resources 140 that can be made available through FRIA include cloud services that are directly accessible on the computing device 10 independent of a browser environment (e.g., photoprint service).

In an example of FIG. 1, the interfaces 130 includes an operating system interface 126, a file system interface 128, and/or other interfaces 129 to other components, such as integrated hardware components (e.g., accelerometer or touchscreen of a computing device) or connected hardware components (e.g., local printer). As examples, the set of interfaces 130 can provide use or control of local resources for print discovery, print jobs, and scan jobs. In one implementation, the inbound interface 122 can be configured to handle requests generated through execution of programmatic resources (e.g., applications) within the browser 110. The requests 112 can be issued using a generic, web-based protocol and format (e.g., Hypertext Transfer Protocol (HTTP) call, File Transfer Protocol (FTP), RESTful call, etc.). In variations, the inbound interface 122 can receive web-based calls from any web-enabled application resident on the computing device 10. Still further, the inbound interface 122 can receive requests formatted as web-based calls from other applications running on the computing device 10.

In some variations, the inbound interface 122 can also be configured to provide responses to the requesting browsers generic, web-based protocol and format.

In some implementations, the FRIA 120 can perform tasks that utilize the functional resources 140 of the computing device 10 based on information and data provided with the request 112. As examples, the request 112 can include data that (i) identifies a query or resource instruct for the functional resource (e.g., print), (ii) input value (e.g., sensor or hardware component output value), (iii) a location on the network of a document that is to be used by the functional resource (e.g., document that is to be printed), and/or (iv) a local location of a document or resource that is to be used by the functional resource. In some implementations, the FRIA 120 also issues responses 113 to the requests 112 from browser 110, and the responses 113 can include output data or information. This output data or information can be utilized in a variety of ways. As specific examples, the FRIA 120 can return (i) confirmations or logs of tasks that are performed by the FRIA 120 in response to requests, (ii) values returned from instructed use of specific hardware components (e.g., sensor output), and/or (iii) processed documents, etc. Still further, the FRIA 120 can be configured to communicate responses or output to other components or locations, such as to the web service 102 or to a location identified by the web service 102. For example, the outbound interface 136 (as described below) can return the response 113 (or output) directly to the web service 102.

In some variations, the outbound interface 136 can issue web-based requests or calls to other components on the computing device 10, such as the browser 110, or other applications. For example, the outbound interface 136 can be configured to issue HTTP calls, FTP calls, RESTful calls or other communications to control or signal components residing on the computing device 10. Still further, the outbound interface 136 can issue calls to network resources, such as web service 102 (e.g., website).

In one implementation, the browser 110 accesses a website that is adapted for the use of local resources and the FRIA 120. The inbound interface 122 fields one or more requests 112 signaled from programmatic resources executing through the browser 110, when the resource 108 is downloaded from the website. The inbound interface 122 can identify a particular local resource or local resource type identified by the request, as well as one or more tasks that are to be performed in connection with the request 112. The request 112 is communicated to task logic 124, which can utilize the relevant local resource interface to access and/or utilize the particular local resource in accordance with the request 112. The task logic 124 can also perform operations in connection with accessing or using the local resource. For example, the request 112 may specify a print operation, which causes the FRIA 120 to return to the programmatic resource (e.g., web-based application 105) executing through the browser 110, via the inbound interface 122, a list of printers available to the computing device 10. In the example, the inbound interface 122 receives the request and identifies the OS interface 126 for determining printers that are available to the computing device 10. The task logic 124 can perform the operation to identify the available printers using the OS interface 126. The inbound interface 122 can issue a response 113 to the requesting application 105 that identifies the available printers.

Subsequently, the programmatic resource executing through the browser 110 can issue additional requests 112, such as printer selection, printer setting, and a document for printing, etc. The subsequent requests 112 can be generated through the browser 110 in response to, for example, user input and/or additional instructs communicated from the download resource 108. The browser 110 can also include data to control the task or output from the FRIA 120 (or components thereof). For example, the request 112 made through the execution environment of the browser 110 can specify control parameters that are utilized by, for example, the specified functional resource of the computing device 10 in providing an output (e.g., printer settings). The control parameters can also be used by the FRIA 120 in utilizing the specified functional resource (e.g., number of copies to print), or in performing the task related to using the functional resources (e.g., confirmation that print job was performed).

In some implementations, task logic 124 includes components for providing specific services or functionality to the FRIA 120. For example, task logic 124 can include one or more local services 132 and a scheduler 134. As an example, the local services 132 can include a raster image print (RIP) engine. The request 112 from the programmatic resource executing through the browser 110 can specify a document for printing. The inbound interface 122 can receive the request 112 and use the RIP engine to produce a raster image of the document. The local service 132 (e.g., RIP engine) can send the output to, for example, a locally connected printer via the OS interface 126 (e.g., through a printer interface).

In some implementations, the FRIA 120 can operate independently of browser 110, or web-based application 105 executing through the browser 110. As an addition or variation, the FRIA 120 can include outbound interface 136 that can be automated or programmatically controlled to retrieve resources 115 for use with local resources of the computing device 10. In one implementation, the scheduler 134 can control the outbound interface 136 in its operation. For example, scheduler 134 can implement a schedule (e.g., daily time) when a retrieval operation is performed by the outbound interface 136. As an example, the outbound interface 136 can retrieve an online news file each morning. In one implementation, the outbound interface 136 generates a request 112 to the inbound interface 122 that specifies the retrieved document or set of documents. The request 112 generated from the browser component 136 can also be in the form of a standard browser-type call (e.g., REST call). The inbound interface 122 can identify the local resource (e.g., printer) and use task logic 124 (e.g., RIP engine) to generate an output for the connected printer or other local resource. The output can be communicated to the local resource (e.g., printer) via the OS interface 126 of the FRIA 120.

As an alternative or variation to outbound interface 136, the inbound interface 122 can generate a control communication to direct the browser 110 to perform operations. The inbound interface 122 can, for example, control the browser to perform retrieval and other operations in accordance with events or schedules such as provided by the scheduler 134.

A wide variety of functionality and services can be provided through a system 100 such as described in an example of FIG. 1. As additional examples, the web service 102 can provide an application or programmatic resource that provides coupons for print by end users. The system 100 can enable the web service to control print operations. For example, if a coupon is limited to one per customer, the user's ability to print multiple copies of the coupon can be controlled by the web-based service. For example, the instruct 109 provided from the web service 102 may enable only single print job for a particular coupon item.

As another example, the web service 102 can receive feedback as to the number of times an item was printed, scanned or otherwise used. For example, the FRIA 120 can communicate feedback to web service 102 (e.g., though browser 110 or directly) that confirms one of print job was completed for a particular item. Thus, in the case of coupons, the web service 102 can receive feedback as to the number of times a coupon was printed.

As another example, the computing device 10 may store documents that can be accessed and acted upon by the application of the web service. For example, the web service 102 can instruct FRIA 120 to locate a particular document, and to send the document to an attached printer. Still further, the FRIA 120 can, for example, use a RIP engine to print the document locally. The FRIA 120 can also modify the document. For example, the RIP engine of the FRIA 120 can create a rasterized version of the document. Alternatively, other services can be included with the FRIA 120 to structure or modified the document based on input from the web service 102.

In other implementations, the web service 102 can specify that the document is to be communicated back to the service 102 after the document is structured or modified. For example, FRIA 120 can execute a script in which its outbound interface 136 signals an HTTP (or HTTPs) communication to a website or designation of the web service 102. To further the example, the FRIA 120 may send a rasterized version of the document back to the web service 102, or to another site designated by the web service 102.

As another example, system 100 may be implemented on a mobile computing device that includes an integrated set of sensors. For example, mobile computing device may include an accelerometer, gyroscope, proximity sensor, light sensor, and/or magnetometer. The FRIA 120 can be configured for a particular platform, such as a mobile computing platform. The interfaces of the FRIA 120 can provide for sensor interfaces, such as made available through the operating system of the device. The browser 110 of the computing device 10 accesses the web service, such as an online gaming service. The download resource 108 from the web service 102 includes instructs that are responsive to gaming action and settings, and may require FRIA 120 to acquire sensor values in real-time in order to enhance the gaming experience. Thus, the sensor values can be read by the FRIA 120, in response to request made through the browser 110. The results of the FRIA 120 operations can include sensor values that are communicated back to the web-based application 105 executing through the browser 110, and then utilized by, for example, the implementation of the JavaScript being executed through the browser 110.

Methodology

Figure 2:
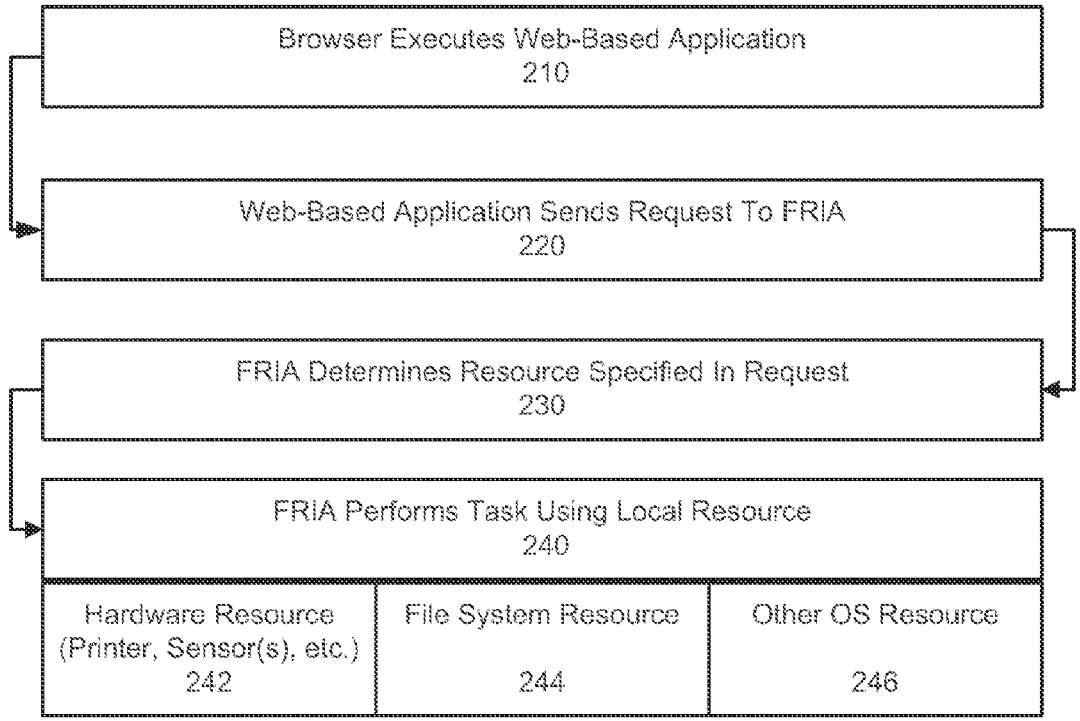
FIG. 2 illustrates an example method that operates on a computing device to expose locally available resources to web-based applications and programmatic resources.
Figure 3:
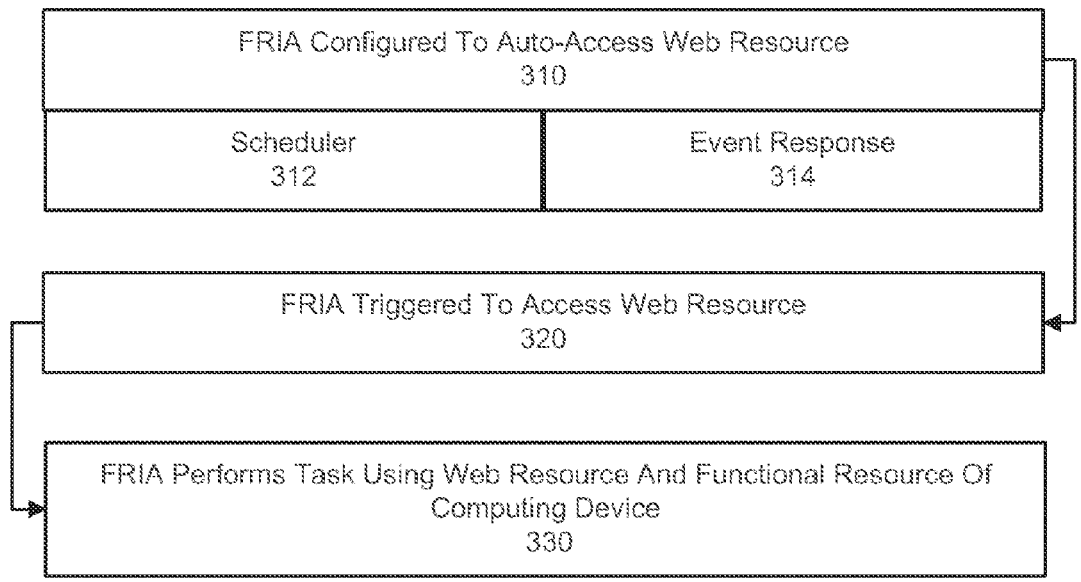
FIG. 3 illustrates an example method for automating use of locally available resources with web-based applications and programmatic resources.
Figure 4:
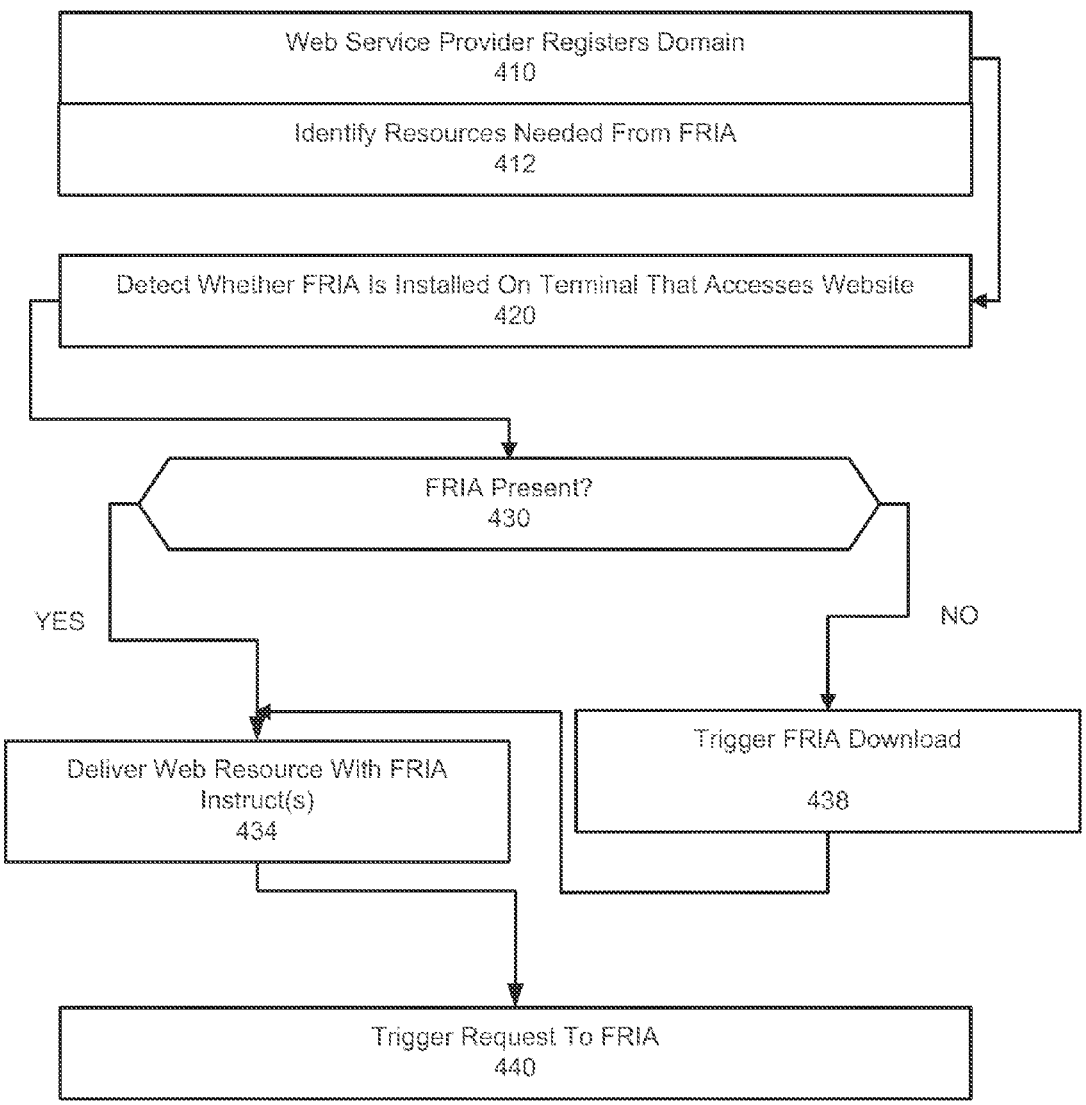
FIG. 4 illustrates an example method for which a web resource can be enabled to utilize a local resource interface application of a computing device

FIG. 2 illustrates an example method that operates on a computing device to expose locally available resources to web-based applications and programmatic resources. FIG. 3 illustrates an example method for automating use of locally available resources with web-based applications and programmatic resources. FIG. 4 illustrates an example method for which a web resource can be enabled to utilize a local resource interface application (e.g., FRIA 120) of a computing device. In describing examples of FIG. 2, FIG. 3 and FIG. 4, reference may be made to elements of FIG. 1 for purpose of illustrating suitable components for performing a step or sub-step being described.

With reference to FIG. 2, the browser 110 of a computing device can be operated to execute a web-based application 105 or other programmatic resources (210). The web-based application can be accessed through, for example, a web site in which FRIA services are enabled. A developer can structure pages or resources at the website to trigger use of the FRIA, with specific resources desired by the developer. The browser 110 can, for example, download the web-based application 105 that includes instructions 109, and the instructions can execute within the browser 110 to generate REST calls to FRIA 120 installed on the computing device 10.

In response to accessing the download resource 108 and executing the application 105 through the browser 110, the application 105 sends a standard web-based call to the FRIA (220). The call can request a resource based on the designations of the developer and the instruct(s) included in the web page.

The FRIA determines what resource is specified in the call (230). For example, the resource can be local, requiring use of a driver, application program interface or port. The operating system interface 126 can be used to access the particular local resource. The FRIA 120 performs tasks using the specified resource (240). In one implementation, the resource specified in the call can correspond to a hardware resource (242), such as a printer (e.g., connected device) or sensor (e.g., accelerometer, gyroscope, etc.). Alternatively, the local resource specified in the call can correspond to a file system resource (244). Other resources, such as home network resources (e.g., locally connected devices across home network) or cloud services can also be specified in the call (246).

The task performed by the FRIA can result in various outcomes, depending on the functionality required from the web resource downloaded by the browser 110. For example, in print examples, the outcome can correspond to a locally connected printer generating a hardcopy of a document. The outcome of the task performed by the FRIA 120, with use of the local resource, can also result in the FRIA 120 signaling data or other information back to the browser 110. For example, the FRIA 120 can signal confirmation that a document was printed back to the web-based application 105 executing through the browser 110, and/or the web site from which the download resource 108 is provided.

With reference to an example of FIG. 3, the FRIA 120 can be configured to access web-based resources automatically (310). In particular, the FRIA 120 can be configured to access automatically access a specific web resource (e.g., located by URL), and to utilize the resource in a particular manner in connection with one or more locally available resources of the computing device.

In one example, as described with FIG. 1, the FRIA can include a scheduler 134 which can control the outbound interface 136 to retrieve specific resources and perform other tasks (312). The scheduler 134 can be configured by, for example, an instruct 109 included in the download resource 108 accessed by the browser 110. As an alternative or addition, the FRIA 120 can be directed to automatically perform, for example, retrieval operations of web resources in response to designated events (314). For example, when a user prints a coupon, the FRIA 120 can be configured to retrieve another coupon.

Once configured, the FRIA 120 can be triggered to access a specific web resource (320). When triggered, the FRIA 120 accesses a designated web resource (e.g., such as located by a URL) and performs specific tasks that utilize a functional resource of the computing device (330). For example, the FRIA 120 can utilize a driver, hardware component or operating system interface in order perform a task that utilizes one of the local resources of the computing device. For example, the use of the local resource can be in conjunction with, for example, a web resource retrieved by the outbound interface 136 of the FRIA 120.

In FIG. 4, a website provider can elect to provide resources that can utilize functional resources of a computing device, such as local or operating system-level components (e.g., drivers, attached devices). In one implementation, website host or developer can elect to register their domain with an access control list (410). The access control list can identify those domains that are permitted to specify instructs for FRIA 120 in their web resources. In one implementation, the access controller is linked to the FRIA 120. For example, each computing device that includes an installed FRIA 120 may also receive an updated access control list that reflects what domains are allowed to specify instructs that result in the FRIA 120 performing a corresponding task.

In addition to registering the domains, each web service provider can also identify what resources are needed from FRIA 120 (412). For example, the host or developer of the web service 102 can specify the need for local print service. The association of the domain, as well as the specific resource(s) that can be specified in the instructs from that domain, can be maintained on the access control list. Thus, the web service provider must have permission to request use or access of a particular type of local resource. A web service that provides, for example, print related functionality (e.g., photo-sharing site) may have access and use of print related interfaces via the FRIA 120 installed on the end user devices. Such a web service may, similarly, not be able to request access to other types of local resources.

In one implementation, the entries of the access control list, including the associated functional computing device resource that is approved for access for the domain, can be determinative of whether the browser 110 signals the request 112 to the FRIA 120, or whether the FRIA 120 responds to the request from the browser 110. In particular, the access control list can determine whether the FRIA 120 responds to a request signaled through a web-based programmatic resource (e.g., application 105) executing through the browser 110 of the computing device. For example, the FRIA 120 can check the domain specified in the request from the application 105 executing within the browser 110 against the approved list of domains in the access control list.

A provider can enable a web-based application to execute and access the functional resources of end user devices (420). In one implementation, the provider can, for example, embed one or more instructions in the download resource 108. As a result, the programmatic resources that are executed through the browsers of the end user terminals signal requests to a locally installed FRIA 120. The provider can also configure the download resource 108 so that the web-based applications 105 execute to access the respective FRIA 120 and utilize the specified functional resources of the corresponding computing device.

When a computing device accesses the website, a programmatic determination can be made as to whether the FRIA 120 is installed on that terminal (430). If the FRIA 120 is present, then the web resource can be downloaded with the instruct to the terminal (434). If the FRIA 120 is not present, then a process can be triggered to enable the FRIA 120 to be downloaded (438). The process can involve prompting the user to accept the download, as well as directing the user to a site or network location where the FRIA 120 is made available for download and installation.

With the FRIA 120 installed, the download resource 108 can provide, for example, the programmatic resource to trigger or signal the request for accessing the FRIA 120 (440). For example, the web-based application 105 can be implemented through Javascript in the browser 110. The web-based application 105 can be structured to trigger or generate a request 112 (e.g., HTTP call) to the FRIA 120. The request 112 can also specify the particular functional resource (or set thereof) that is needed with the request.

Computer Hardware Description

Figure 5:
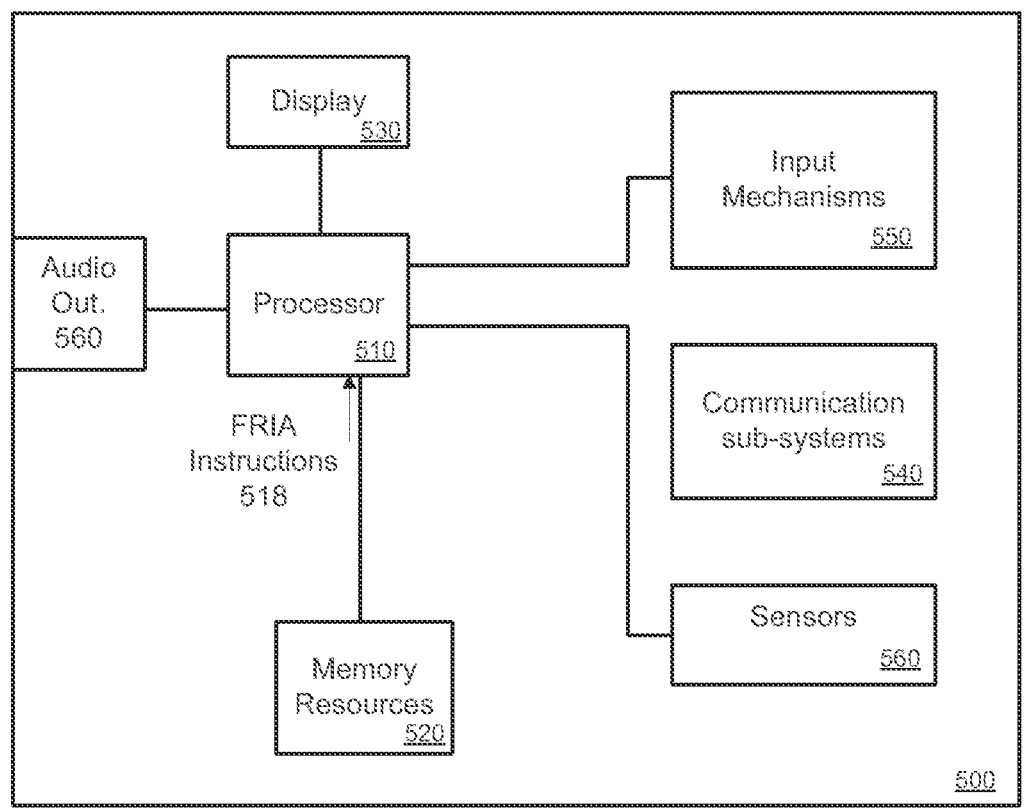
FIG. 5 illustrates an example hardware diagram for a computer system upon which embodiments described herein may be implemented.

FIG. 5 illustrates an example computer system upon which embodiments described herein may be implemented. According to some implementations, the computing device 500 can correspond to a desktop computer, laptop computer, mobile computing device (e.g., cellular device that is capable of telephony, messaging, and data services), tablet, laptop, netbook, media playback device, smart television, media playback device, projector, camera, printer, scanner or other network enabled device. The computing device 500 includes a processor 510, memory resources 520, a display device 530, one or more communication sub-systems 540, and an input mechanism 550. The communication sub-systems 540 can include network ports, such as wireline or wireless (e.g., cellular, WiFi, etc.) communication ports for enabling web browsing. The computing device 500 may also include one or more sensors 560 (e.g., accelerometer, proximity sensor, light sensor, touchscreen, magnetometer, etc.), and various ports for connected devices.

The computing device 500 may operate an operating system to enable use of the various components of the device. Additionally, the computing device 500 can implement application level logic and programming. The memory 520 stores instructions for execution by processor 510. In one implementation, the processor 510 can run applications using instructions stored in memory 520. With reference to an example of FIG. 1, the processor 510 can run applications corresponding to the browser 110 and FRIA 120. In one implementation, the processor 510 can execute application instructions 518 for implementing the FRIA 120 ("FRIA instructions 518") as a constant process on the computing device 10. In this way, FRIA 120 operates and awaits requests from web-based programmatic resources, such as a web-based application executing through the browser. Accordingly, the processor 510 can be configured with software and/or other logic to perform one or more processes, steps and other functions provided with examples, such as described by FIG. 1, FIG. 2 or FIG. 3, as well as elsewhere in this document.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions that, when executed by one or more processors of a computing device, cause the one or more processors to:
   execute an interface application on the computing device to receive a request generated by a web-based application executing on any respective web browser of a plurality of web browsers on the computing device, the interface application comprising an inbound interface to the respective web-browser and a set of local interfaces to a plurality of functional resources of the computing device;
   identify, from the received request and via execution of the interface application, (i) a specified one of the plurality of functional resources of the computing device, the specified functional resource being inaccessible to the web-based application due to a browser object model (BOM) of the respective web browser, and (ii) a requested task to be performed for the web-based application using the specified functional resource; and bypass the BOM of the respective web browser for the web-based application by accessing, by the interface application via one of the set of local interfaces, the specified functional resource to perform the requested task for the web-based application;

wherein execution of the interface application on the computing device renders BOMs of each of the plurality of web browsers agnostic to the web-based application.

2. The non-transitory computer-readable medium of claim 1, wherein the executed instructions cause the one or more processors to access the specified functional resource through an operating system of the computing device.

3. The non-transitory computer-readable medium of claim 1, wherein the executed instructions cause the one or more processors to identify the specified functional resource by interfacing, through an operating system of the computing device, with one or more hardware components that are provided with or connected to the computing device.

4. The non-transitory computer-readable medium of claim 1, wherein the plurality of functional resources includes a set of devices that are connected to or integrated with the computing device.

5. The non-transitory computer-readable medium of claim 3, wherein the one or more hardware components include at least one of a printer, scanner, copier, projector, television, or sensor.

6. The non-transitory computer-readable medium of claim 1, wherein the requested task comprises a print job, and wherein the specified functional resource comprises a connected printing device of the computing device.

7. The non-transitory computer-readable medium of claim 1, wherein the executed instructions further cause the one or more processors to:
    determine an output, from the specified functional resource, corresponding to a connected device of the computing device; and
    return a response to the web-based application that is based on the output.

8. The non-transitory computer-readable medium of claim 1, wherein the received request comprises a Hypertext Transfer Protocol (HTTP) call.

9. The non-transitory computer-readable medium of claim 8, wherein the received request comprises a Representational State Transfer call.

10. The non-transitory computer-readable medium of claim 1, wherein the executed instructions cause the one or more processors to execute the interface application automatically as a background process when the computing device is operational.

11. A computing device comprising:
    one or more memory resources storing an interface application; and
    one or more processors coupled to the memory resources, the one or more processors executing the interface application, causing the one or more processors to:
        receive a call from a web-based application executing on any respective web-browser of a plurality of web browsers on the computing device, wherein the interface application comprises an inbound interface to the respective web browser and a set of local interfaces to a plurality of functional resources of the computing device;
        identify from the received call, (i) a specified one of the plurality of functional resources of the computing device, the specified functional resource being inaccessible to the web-based application due to a browser object model (BOM) of the respective web browser, and (ii) a requested task to be performed for the web-based application using the specified functional resource;
        bypass the BOM of the respective web browser for the web-based application by accessing, by the interface application via one of the set of local interfaces, the specified functional resource to perform the requested task for the web-based application; and
        provide an output, based on utilizing the specified functional resource, to the web-based application;
    wherein execution of the interface application on the computing device renders BOMB of each of the plurality of web browsers agnostic to the web-based application.

12. The computing device of claim 11, wherein the one or more processors execute the interface application automatically as a background process when the computing device is operational.

13. The computing device of claim 12, wherein the executing interface application causes the one or more processors to interface, through an operating system of the computing device, with one or more hardware components that are provided with or connected to the computing device.

14. The computing device of claim 11, wherein the executing interface application causes the one or more processors to associate a domain, from which the web-based application is provided, with an access control list that provides permission for a component of the computing device to access the specified functional resource.

15. A method for operating a computing device, the method comprising:
    executing an interface application to receive a request generated by a web-based application executing on any respective web-browser of a plurality of web browsers on the computing device, wherein the interface application comprises an inbound interface to the respective web browser and a set of local interfaces to a plurality of functional resources of the computing device;
    identifying from the received request, (i) a specified one of the plurality of functional resources of the computing device, the specified functional resource being inaccessible to the web-based application due to a browser object model (BOM) of the respective web browser, and (ii) a requested task to be performed for the web-based application using the specified functional resource; and
    bypass the BOM of the respective web browser for the web-based application by accessing, by the interface application via one of the set of local interfaces, the specified functional resource to perform the requested task for the web-based application;
    wherein execution of the interface application on the computing device renders BOMs of each of the plurality of web browsers agnostic to the web-based application.

* * * * *

UNITED STATES PATENT AND TRADEMARK OFFICE
CERTIFICATE OF CORRECTION

PATENT NO.         : 9,753,774 B2
APPLICATION NO.    : 14/439062
DATED              : September 5, 2017
INVENTOR(S)        : Thomas J. Gilg et al.

It is certified that error appears in the above-identified patent and that said Letters Patent is hereby corrected as shown below:

In the Claims

In Column 14, Line 18, in Claim 11, delete "BOMB" and insert -- BOMs --, therefor.

Signed and Sealed this
Thirteenth Day of March, 2018

Andrei Iancu
*Director of the United States Patent and Trademark Office*